(12) United States Patent
Chen et al.

(10) Patent No.: US 12,306,402 B2
(45) Date of Patent: May 20, 2025

(54) OPTICAL SYSTEM AND HEAD-MOUNTED DEVICE

(71) Applicant: LARGAN PRECISION CO., LTD., Taichung (TW)

(72) Inventors: Kuan-Ming Chen, Taichung (TW); Yu Jie Hong, Taichung (TW); Fuh-Shyang Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 683 days.

(21) Appl. No.: 17/549,551

(22) Filed: Dec. 13, 2021

(65) Prior Publication Data

US 2023/0143390 A1     May 11, 2023

(30) Foreign Application Priority Data

Nov. 10, 2021    (TW) ................................ 110213228

(51) Int. Cl.
*G02B 27/01*      (2006.01)
*G02B 1/11*       (2015.01)
(Continued)

(52) U.S. Cl.
CPC ............ *G02B 27/0172* (2013.01); *G02B 1/11* (2013.01); *G02B 5/3025* (2013.01);
(Continued)

(58) Field of Classification Search
CPC .... G02B 27/0172; G02B 1/11; G02B 5/3025; G02B 5/3083; G02B 13/18; G02B 17/08;
(Continued)

(56) References Cited

U.S. PATENT DOCUMENTS 5,644,436 A * 7/1997 Togino .................. G02B 13/18
359/730
9,555,589 B1    1/2017 Ambur
(Continued)

FOREIGN PATENT DOCUMENTS

TW           202045982       12/2020

OTHER PUBLICATIONS

Wikipedia webpage "Anti-reflective coating" (Year: 2021).*
MIL-HDBK-141 "Military Standardization Handbook Optical Design" p. 8-15 (Year: 1962).*

*Primary Examiner* — George G. King
(74) *Attorney, Agent, or Firm* — Maschoff Brennan (57) ABSTRACT

An optical system includes an image surface, an aperture stop, a first and a second quarter-wave plate, a partial reflector, a reflective polarizer, a first and a second optical lens element. The image surface and the aperture stop are respectively at a front side and a rear side of the optical system. The first quarter-wave plate is between the image surface and the aperture stop. The partial reflector between the first quarter-wave plate and the aperture stop has an average light reflectivity of 35%. The second quarter-wave plate is between the partial reflector and the aperture stop. The reflective polarizer is between the second quarter-wave plate and the aperture stop. The first optical lens element between the image surface and the aperture stop has a convex front-side surface. The second optical lens element between the first optical lens element and the aperture stop has a concave rear-side surface.

24 Claims, 7 Drawing Sheets

(51) Int. Cl.
*G02B 5/30* (2006.01)
*G02B 13/18* (2006.01)
*G02B 17/08* (2006.01)
*G02B 25/00* (2006.01)

(52) U.S. Cl.
CPC ........... *G02B 5/3083* (2013.01); *G02B 13/18* (2013.01); *G02B 17/08* (2013.01); *G02B 17/0856* (2013.01); *G02B 25/001* (2013.01)

(58) Field of Classification Search
CPC ... G02B 17/0856; G02B 25/001; G02B 13/00
See application file for complete search history.

(56) References Cited

U.S. PATENT DOCUMENTS

| | | |
|---|---|---|
| 9,557,568 B1 | 1/2017 | Ouderkirk |
| 9,581,744 B1 | 2/2017 | Yun |
| 9,581,827 B1 | 2/2017 | Wong |
| 9,599,761 B1 | 3/2017 | Ambur |
| 9,715,114 B2 | 7/2017 | Yun |
| 9,829,616 B2 | 11/2017 | Yun |
| 9,835,777 B2 | 12/2017 | Ouderkirk |
| 9,945,998 B2 | 4/2018 | Ouderkirk |
| 9,945,999 B2 | 4/2018 | Wong |
| 9,952,371 B2 | 4/2018 | Ambur |
| 9,995,939 B2 | 6/2018 | Yun |
| 10,007,035 B2 | 6/2018 | Ouderkirk |
| 10,007,043 B2 | 6/2018 | Ambur |
| 10,078,164 B2 | 9/2018 | Yun |
| 10,203,489 B2 | 2/2019 | Khan |
| 10,302,950 B2 | 5/2019 | Ouderkirk |
| 10,330,930 B2 | 6/2019 | Wong |
| 10,338,380 B2 | 7/2019 | Yun |
| 10,338,393 B2 | 7/2019 | Yun |
| 10,394,040 B2 | 8/2019 | Gollier |
| 10,444,496 B2 | 10/2019 | Ambur |
| 10,564,427 B2 | 2/2020 | Ouderkirk |
| 10,663,727 B2 | 5/2020 | Ouderkirk |
| 10,670,867 B2 | 6/2020 | Yun |
| 10,678,052 B2 | 6/2020 | Ouderkirk |
| 10,747,002 B2 | 8/2020 | Yun |
| 10,747,003 B2 | 8/2020 | Ouderkirk |
| 10,754,159 B2 | 8/2020 | Ouderkirk |
| 10,838,208 B2 | 11/2020 | Yun |
| 10,921,594 B2 | 2/2021 | Ambur |
| 2002/0024743 A1* | 2/2002 | Endo .................. G02B 27/0172 359/645 |
| 2010/0177113 A1* | 7/2010 | Gay ....................... G02B 30/27 359/484.04 |
| 2016/0116745 A1* | 4/2016 | Osterhout ............ H04R 1/1041 359/614 |
| 2017/0068100 A1* | 3/2017 | Ouderkirk .............. G02B 5/305 |
| 2017/0334232 A1* | 11/2017 | Yashiki ................. G07D 7/003 |
| 2018/0101020 A1* | 4/2018 | Gollier ................ G02B 27/022 |
| 2019/0265465 A1 | 8/2019 | Wong |
| 2019/0265466 A1 | 8/2019 | Yun |
| 2019/0285902 A1* | 9/2019 | Ouderkirk .............. G02B 27/30 |
| 2019/0377182 A1* | 12/2019 | Sharp ................ G02B 27/0018 |
| 2020/0124856 A1 | 4/2020 | Ouderkirk |
| 2020/0241305 A1 | 7/2020 | Ouderkirk |
| 2021/0003901 A1 | 1/2021 | Yaroshchuk |
| 2021/0149095 A1* | 5/2021 | Sato ......................... G02B 1/11 |
| 2022/0373806 A1* | 11/2022 | Stroud ............... G02B 27/0176 |

\* cited by examiner

OPTICAL SYSTEM AND HEAD-MOUNTED DEVICE

RELATED APPLICATIONS

This application claims priority to Taiwan Application 110213228, filed on Nov. 10, 2021, which is incorporated by reference herein in its entirety.

BACKGROUND

Technical Field

The present disclosure relates to an optical system and a head-mounted device, more particularly to an optical system applicable to a head-mounted device.

Description of Related Art

With the advancement of semiconductor manufacturing technology, electronic components have been miniaturized and the performance of miniature electronic components has been improved, and image sensors for having more pixels has been scaled down. Therefore, featuring high image quality becomes one of the indispensable features of a miniature optical system nowadays. Furthermore, due to the popularization of high-performance microprocessors and microdisplays, the technology related to smart head-mounted devices rapidly develops in recent years. With the rise of artificial intelligence, electronic devices equipped with optical systems are trending towards multi-functionality for various applications, and the functional requirements for computer vision have been increasing.

The head-mounted devices have become smaller and more lightweight, and also have various intelligent applications such as virtual reality (VR), augmented reality (AR) and mixed reality (MR) in the rapidly developing technology landscape. VR has been widely applied in medical health areas and engineering, real estate, education, video game and entertainment industries. However, the head-mounted devices are still in the developing stage, and there are still many areas that need to be improved, such as the weight and size of the head-mounted devices and the quality of images. In the early stages, the VR head-mounted devices use Fresnel lenses. Although Fresnel lenses may have relatively short focal lengths, the use of Fresnel lenses for image projection reduces image quality. Therefore, researchers and developers are looking for lens combinations that are small in size and provide high image quality.

SUMMARY

According to one aspect of the present disclosure, an optical system includes an image surface, an aperture stop, a first quarter-wave plate, a partial reflector, a second quarter-wave plate, a reflective polarizer, a first optical lens element and a second optical lens element. The image surface is located at a front side of the optical system, and the aperture stop is located at a rear side of the optical system. The first quarter-wave plate is located between the image surface and the aperture stop. The partial reflector has an average light reflectivity of at least 35%, and the partial reflector is located between the first quarter-wave plate and the aperture stop. The second quarter-wave plate is located between the partial reflector and the aperture stop. The reflective polarizer is located between the second quarter-wave plate and the aperture stop. The first optical lens element is located between the image surface and the aperture stop and has a front-side surface being convex. The second optical lens element is located between the first optical lens element and the aperture stop and has a rear-side surface being concave. When a curvature radius of a front-side surface of the second optical lens element is R3, and a curvature radius of the rear-side surface of the second optical lens element is R4, the following condition is satisfied: $|R3|/|R4|>1.2$.

According to another aspect of the present disclosure, a head-mounted device includes a display unit, a digital signal processor, an inertial measurement unit, a support structure and two optical systems. The display unit is configured to face a user's eye to display an image. The digital signal processor is in signal communication with the display unit. The inertial measurement unit is in signal communication with the digital signal processor. The support structure is configured to be worn on the user's head. The optical systems are located on one side of the display unit, and each of the optical systems includes an image surface, an aperture stop, a first quarter-wave plate, a partial reflector, a second quarter-wave plate, a reflective polarizer, a first optical lens element and a second optical lens element. The image surface is located at a front side of the optical system and located on the display unit, and the aperture stop is located at a rear side of the optical system. The first quarter-wave plate is located between the image surface and the aperture stop. The partial reflector has an average light reflectivity of at least 35%, and the partial reflector is located between the first quarter-wave plate and the aperture stop. The second quarter-wave plate is located between the partial reflector and the aperture stop. The reflective polarizer is located between the second quarter-wave plate and the aperture stop. The first optical lens element is located between the image surface and the aperture stop, and the first optical lens element has a front-side surface being convex. The second optical lens element is located between the first optical lens element and the aperture stop, and the second optical lens element has a rear-side surface being concave. When a curvature radius of a front-side surface of the second optical lens element is R3, and a curvature radius of the rear-side surface of the second optical lens element is R4, and the following condition is satisfied: $|R3|/|R4|>1.2$.

BRIEF DESCRIPTION OF THE DRAWINGS

The disclosure can be better understood by reading the following detailed description of the embodiments, with reference made to the accompanying drawings as follows.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides an optical system. The optical system includes an image surface, an aperture stop, a first quarter-wave plate, a partial reflector, a second quarter-wave plate, a reflective polarizer, a first optical lens element and a second optical lens element. The image surface is located at a front side of the optical system, and the aperture stop is located at a rear side of the optical system. Said front side of the optical system refers to one side of the optical system located relatively close to a display unit which displays images, and said rear side of the optical system refers to one side of the optical system located relatively close to, for example, a viewer's eye. In addition, the image surface is located on the display unit, and the aperture stop can be located at a position where the viewer's eye is located.

The first quarter-wave plate is located between the image surface and the aperture stop. The partial reflector has an average light reflectivity of at least 35%, and the partial reflector is located between the first quarter-wave plate and the aperture stop. The second quarter-wave plate is located between the partial reflector and the aperture stop. The reflective polarizer is located between the second quarter-wave plate and the aperture stop. The first optical lens element is located between the image surface and the aperture stop, and the first optical lens element has a front-side surface being convex. The second optical lens element is located between the first optical lens element and the aperture stop. Said average light reflectivity may refer to an average value of light reflectivities of the partial reflector for various wavelengths of light.

According to the present disclosure, by the arrangement of the wave plates, the reflective polarizer, the partial reflector and the lens elements, light traveling in the optical system is reflected and refracted, so that the required length of the optical system for imaging can be reduced without compromising the image quality. Please refer to FIG. 8, which shows the track of light travelling in the optical system. At first, light is incident from the display unit SC in a vertical polarization state, then the light passes through the first quarter-wave plate QWP1 and is converted into a circular polarization state, and then, the light in the circular polarization state passes through the second quarter-wave plate QWP2 and is converted into a horizontal polarization state. The reflective polarizer RP only allows light in the vertical polarization state to pass, so the light in the horizontal polarization state is reflected by the reflective polarizer RP and passes through the second quarter-wave plate QWP2 again and is converted into the circular polarization state. Then, the light in the circular polarization state is reflected by the partial reflector BS and passes through the second quarter-wave plate QWP2 for the third time and is converted into the vertical polarization state, and then, the light in the vertical polarization state can pass through the reflective polarizer RP. Therefore, by such reflection means, the required total track length can be folded, and thus, the length of the optical system can be reduced. Moreover, the number of optical lens elements of the optical system can be two, three or four, and the present disclosure is not limited thereto. Moreover, the first quarter-wave plate, the second quarter-wave plate and the partial reflector may be coated on (or attached to) the optical lens surfaces, respectively, or they may be separate components with respect to the optical lens elements, and the present disclosure is not limited thereto. Moreover, the partial reflector is, for example but not limited to, a mirror configured to reflect a specific amount of light. For example, in some cases, the partial reflector is configured to allow a portion of light to pass therethrough and reflect the other portion of the light.

The second optical lens element has a rear-side surface being concave. Therefore, it is favorable for improving the image quality.

When a curvature radius of a front-side surface of the second optical lens element is R3, and a curvature radius of the rear-side surface of the second optical lens element is R4, the following condition is satisfied: |R3|/|R4|>1.2. Therefore, it is favorable for improving the image quality. Moreover, the following condition can also be satisfied: |R3|/|R4|>1.5. Moreover, the following condition can also be satisfied: |R3|/|R4|>1.6.

Figure 8:
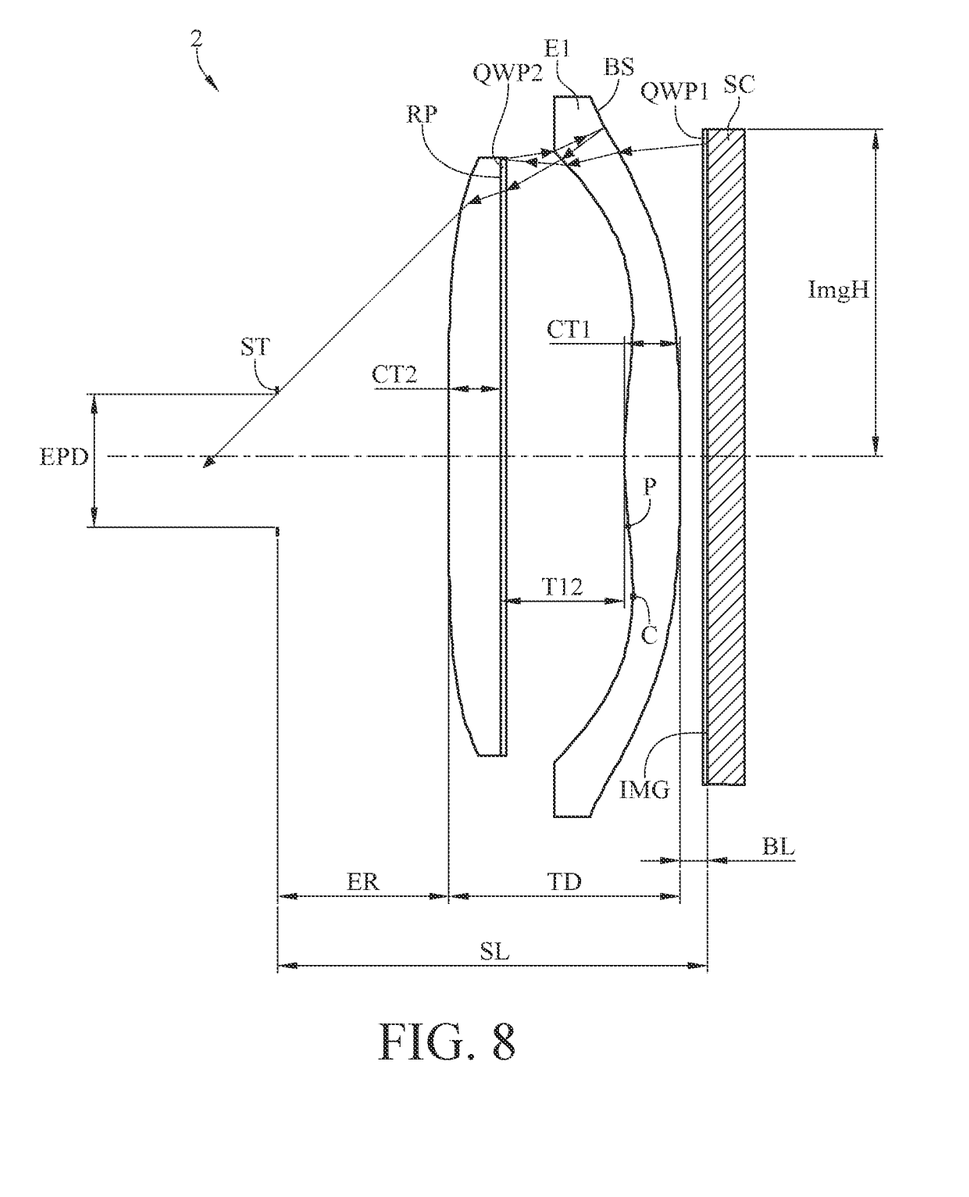
FIG. 8 shows a schematic view of ImgH, CT1, CT2, T12, ER, EPD, BL, TD, SL and one inflection point and one critical point of a first optical lens element according to the 2nd embodiment of the present disclosure.

A rear-side surface of the first optical lens element can have at least one inflection point. Therefore, it is favorable for peripheral imaging and aberration corrections. Please refer to FIG. 8, which shows a schematic view of the inflection point P of the rear-side surface of the first optical lens element E1 according to the 2nd embodiment of the present disclosure. The inflection point P of the rear-side surface of the first optical lens element E1 in FIG. 8 is only exemplary. Each of the optical lens elements in various embodiments of the present disclosure can have one or more inflection points.

The rear-side surface of the first optical lens element can have at least one critical point. Therefore, it is favorable for peripheral imaging and aberration corrections. Please refer to FIG. 8, which shows a schematic view of the critical point C of the rear-side surface of the first optical lens element E1 according to the 2nd embodiment of the present disclosure. The critical point C of the rear-side surface of the first optical lens element E1 in FIG. 8 is only exemplary. Each of the optical lens elements in various embodiments of the present disclosure can have one or more critical points.

The first optical lens element can have positive refractive power. Therefore, it is favorable for reducing the total length of the optical system.

The second optical lens element can have negative refractive power. Therefore, it is favorable for correcting distortion and other aberrations.

At least one lens surface of at least one of the first optical lens element and the second optical lens element can be aspheric. Therefore, it is favorable for peripheral imaging and aberration corrections.

When an Abbe number of the first optical lens element is V1, and a refractive index of the first optical lens element is N1, the following condition can be satisfied: 33<V1/N1<38. Therefore, it is favorable for preventing overly large differences in refractive indices caused by angle difference due to light reflections, thereby ensuring image quality.

When the Abbe number of the first optical lens element is V1, and an Abbe number of the second optical lens element is V2, the following condition can be satisfied: 110<V1+

V2<115. Therefore, a proper clarity of images is favorable for improving the image quality of the optical system.

When the refractive index of the first optical lens element is N1, and a refractive index of the second optical lens element is N2, the following condition can be satisfied: $2.8<N1+N2<3.2$. Therefore, it is favorable for providing better image quality.

When a focal length of the optical system is f, and an axial distance between the front-side surface of the first optical lens element and the image surface is BL, the following condition can be satisfied: $11<f/BL<22$. Therefore, it is favorable for reducing the length of the optical system and providing a space for accommodating functional components, such as a polarizer. Please refer to FIG. 8, which shows a schematic view of BL according to the 2nd embodiment of the present disclosure.

When an axial distance between the aperture stop and the image surface is SL, and the focal length of the optical system is f, the following condition can be satisfied: $0<SL/f<2$. Therefore, it is favorable for balancing the image quality and the length of the optical system. Please refer to FIG. 8, which shows a schematic view of SL according to the 2nd embodiment of the present disclosure.

When an axial distance between the aperture stop and the rear-side surface of the second optical lens element is ER, and the axial distance between the aperture stop and the image surface is SL, the following condition can be satisfied: $0<ER/SL<0.5$. Therefore, it is favorable for reducing the user's dizziness. Please refer to FIG. 8, which shows a schematic view of ER and SL according to the 2nd embodiment of the present disclosure.

When the focal length of the optical system is f, and an image height on the image surface (which can be half of a diagonal length of the display unit) is ImgH, the following condition can be satisfied: $0.8<f/ImgH<1.2$. Therefore, it is favorable for providing larger images. Please refer to FIG. 8, which shows a schematic view of ImgH according to the 2nd embodiment of the present disclosure.

When a central thickness of the first optical lens element is CT1, a central thickness of the second optical lens element is CT2, and an axial distance between the rear-side surface of the first optical lens element and the front-side surface of the second optical lens element is T12, the following condition can be satisfied: $0.5<(CT1+CT2)/T12<1.5$. Therefore, it is favorable for reducing the length of the optical system. Please refer to FIG. 8, which shows a schematic view of CT1, CT2 and T12 according to the 2nd embodiment of the present disclosure.

When an axial distance between the front-side surface of the first optical lens element and the rear-side surface of the second optical lens element is TD, and the axial distance between the aperture stop and the image surface is SL, the following condition can be satisfied: $0.2<TD/SL<0.8$. Therefore, it is favorable for reducing the length of the optical system. Please refer to FIG. 8, which shows a schematic view of TD and SL according to the 2nd embodiment of the present disclosure.

When a size of the aperture stop is EPD, and the image height on the image surface is ImgH, the following condition can be satisfied: $0.45<EPD/ImgH<0.65$. Therefore, it is favorable for providing the user with better immersive experiences. Please refer to FIG. 8, which shows a schematic view of EPD and ImgH according to the 2nd embodiment of the present disclosure.

When the axial distance between the rear-side surface of the first optical lens element and the front-side surface of the second optical lens element is T12, and the axial distance between the front-side surface of the first optical lens element and the image surface is BL, the following condition can be satisfied: $4<T12/BL<6$. Therefore, it is favorable for reducing the distance between the optical system and the image displayed by the display unit.

At least one lens surface of at least one of the first optical lens element and the second optical lens element can have an anti-reflection layer, and the anti-reflection layer is a sub-wavelength structure. Therefore, it is favorable for preventing stray light from influencing the image quality.

The optical system can further include a third optical lens element located between the aperture stop and the image surface, and at least one lens surface of the third optical lens element can be planar. Therefore, it is favorable for improving the image quality and correcting aberrations. Moreover, the optical system can further include a fourth optical lens element to further improve the image quality.

The present disclosure provides a head-mounted device. The head-mounted device includes a display unit, a digital signal processor, an inertial measurement unit, a support structure and two optical systems as described above. The display unit is configured to face a user's eye to display an image, the digital signal processor is in signal communication with the display unit and the inertial measurement unit, and the support structure is configured to be worn on the user's head. The two optical systems respectively correspond to two eyes of the user.

The head-mounted device can further include at least one camera in signal communication with the digital signal processor, and the camera is configured to capture an image of external environment for displaying on the display unit. The image of external environment captured by the camera can be instantly displayed on the display unit, so that the user wearing the head-mounted device is able to recognize the environment.

Each of the optical systems can further include a polarizing element located between the display unit and the partial reflector, and the display unit is an organic light emitting diode (OLED) panel and has a color filter. In addition, the OLED panel filters light by the color filter, and the OLED panel may not have a polarizing element therein. As such, light emitted from the display unit is polarized by the polarizing element located between the display unit and the partial reflector.

The head-mounted device can further include at least one compacting mechanism configured for reducing dimensions of the head-mounted device. For example, the compacting mechanism is configured such that the dimensions of the head-mounted device can be reduced (e.g., folding the head-mounted device) when the head-mounted device is not in use.

The head-mounted device can further include at least one auto focus unit disposed corresponding to at least one of the optical systems, and the auto focus unit is configured to move at least one optical lens element of the at least one of the optical systems. Therefore, the auto focus unit provides the optical system with a focus function, so that the focal length is adjustable according to the vision of various users. In some configurations, the number of the at least one auto focus unit is one, and the auto focus unit is capable of adjusting the focal lengths of the two optical systems at the same time. In other configurations, the number of the at least one auto focus unit is two, and the two auto focus units are disposed respectively corresponding to the two optical systems and configured to adjust the focal lengths of the two optical systems, respectively.

Note that when one component is said to be in signal communication with another component in the descriptions above and below, the two components may transfer and receive signals between each other wirelessly or via a signal cable.

According to the present disclosure, the aforementioned features and conditions can be utilized in numerous combinations so as to achieve corresponding effects.

According to the present disclosure, the optical lens elements of the optical system can be made of either glass or plastic material. When the optical lens elements are made of glass material, the refractive power distribution of the optical may be more flexible, and the influence on imaging caused by external environment temperature change may be reduced. The glass optical lens element can either be made by grinding or molding. When the optical lens elements are made of plastic material, the manufacturing costs can be effectively reduced. Furthermore, lens surfaces of each optical lens element can be arranged to be spherical or aspheric. Spherical optical lens elements are simple in manufacture. Aspheric optical lens element design allows more control variables for eliminating aberrations thereof and reducing the required number of optical lens elements, and the total track length of the optical system can therefore be effectively shortened. Additionally, the aspheric lens surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, each of a front-side surface and a rear-side surface has a paraxial region and an off-axis region. The paraxial region refers to the region of the surface where light rays travel close to the optical axis, and the off-axis region refers to the region of the surface away from the paraxial region. Particularly, unless otherwise stated, when the optical lens element has a convex surface, it indicates that the surface is convex in the paraxial region thereof; when the optical lens element has a concave surface, it indicates that the surface is concave in the paraxial region thereof. Moreover, when a region of refractive power or focus of an optical lens element is not defined, it indicates that the region of refractive power or focus of the optical lens element is in the paraxial region thereof.

According to the present disclosure, an inflection point is a point on the lens surface of the optical lens element at which the lens surface changes from concave to convex, or vice versa. A critical point is a non-axial point of the lens surface where its tangent is perpendicular to the optical axis.

According to the present disclosure, the image surface of the optical system, based on the corresponding display unit, can be flat or curved, especially a curved surface being concave facing towards the rear side of the optical system.

According to the present disclosure, the optical system can include at least one stop, such as an aperture stop, a glare stop or a field stop. Said glare stop or said field stop is set for eliminating the stray light and thereby improving image quality thereof.

According to the present disclosure, the optical system can include an aperture control unit. The aperture control unit may be a mechanical component or a light modulator, which can control the size and shape of the aperture through electricity or electrical signals. The mechanical component can include a movable member, such as a blade assembly or a light shielding sheet. The light modulator can include a shielding element, such as a filter, an electrochromic material or a liquid-crystal layer. The aperture control unit controls the amount of incident light or exposure time to enhance the capability of image quality adjustment. In addition, the aperture control unit can be the aperture stop of the present disclosure, which changes the f-number to obtain different image effects, such as the depth of field or lens speed.

According to the above description of the present disclosure, the following specific embodiments are provided for further explanation.

1st Embodiment

Figure 1:
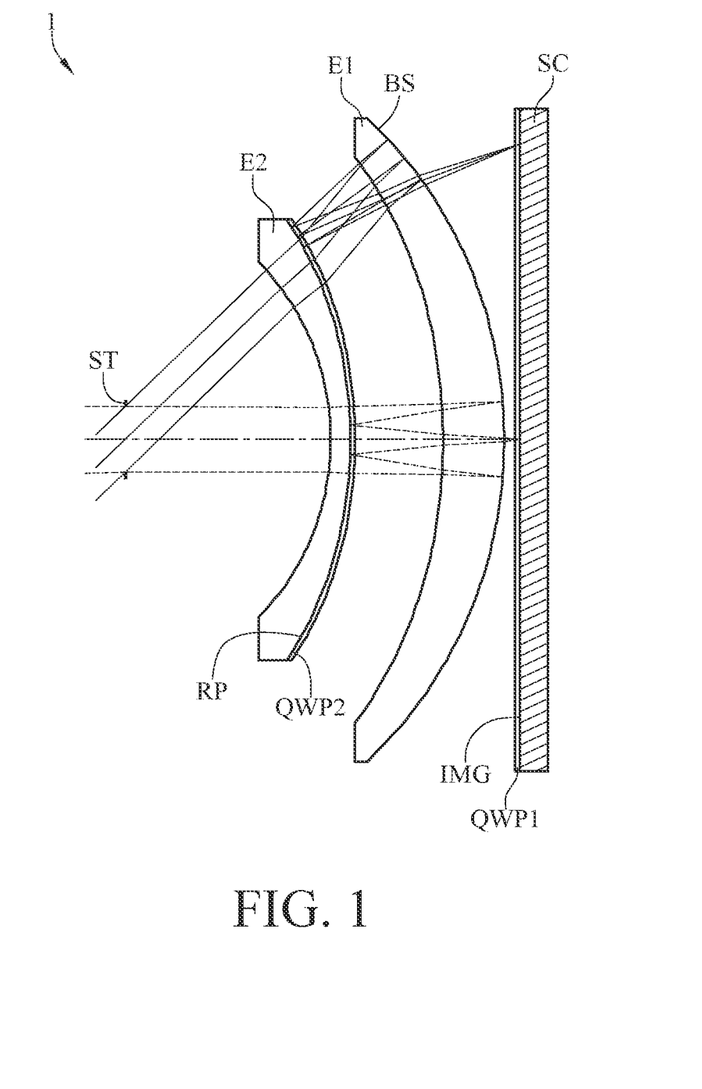
FIG. 1 is a schematic view of an optical system and a display unit according to the 1st embodiment of the present disclosure.

FIG. 1 is a schematic view of an optical system and a display unit according to the 1st embodiment of the present disclosure. The optical system 1 includes, in order from a front side to a rear side, an image surface IMG, a first quarter-wave plate QWP1, a partial reflector BS, a first optical lens element E1, a second quarter-wave plate QWP2, a reflective polarizer RP, a second optical lens element E2 and an aperture stop ST. The display unit SC is disposed on the image surface IMG. The optical system 1 includes two optical lens elements (E1 and E2) with no additional optical lens element disposed between the two optical lens elements.

The first optical lens element E1 with positive refractive power has a front-side surface being convex and a rear-side surface being concave. The first optical lens element E1 is made of plastic material and has the front-side surface and the rear-side surface being both aspheric.

The second optical lens element E2 with negative refractive power has a front-side surface being convex and a rear-side surface being concave. The second optical lens element E2 is made of plastic material and has the front-side surface and the rear-side surface being both aspheric.

The first quarter-wave plate QWP1 is disposed on the image surface IMG.

The partial reflector BS is a partial reflection layer coated on the front-side surface of the first optical lens element E1, and the partial reflector BS has an average light reflectivity of 50%.

The reflective polarizer RP is a reflective polarization layer coated on the front-side surface of the second optical lens element E2, and the second quarter-wave plate QWP2 is attached to the reflective polarizer RP.

The equation of the aspheric surface profiles of the aforementioned optical lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the displacement in parallel with an optical axis from an axial vertex on the aspheric surface to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10 and 12.

In the optical system 1 according to the 1st embodiment, when a focal length of the optical system 1 is f, an f-number of the optical system 1 is Fno, and half of a maximum field of view of the optical system 1 is HFOV, these parameters have the following values: f=20.99 millimeters (mm), Fno=2.33, and HFOV=46 degrees (deg.).

When a curvature radius of the front-side surface of the second optical lens element E2 is R3, and a curvature radius of the rear-side surface of the second optical lens element E2 is R4, the following condition is satisfied: |R3|/|R4|=1.682.

When an Abbe number of the first optical lens element E1 is V1, and a refractive index of the first optical lens element E1 is N1, the following condition is satisfied: V1/N1=36.27.

When the Abbe number of the first optical lens element E1 is V1, and an Abbe number of the second optical lens element E2 is V2, the following condition is satisfied: V1+V2=112.

When the refractive index of the first optical lens element E1 is N1, and a refractive index of the second optical lens element E2 is N2, the following condition is satisfied: N1+N2=3.0881.

When the focal length of the optical system 1 is f, and an axial distance between the front-side surface of the first optical lens element E1 and the image surface IMG is BL, the following condition is satisfied: f/BL=21.553.

When an axial distance between the aperture stop ST and the image surface IMG is SL, and the focal length of the optical system 1 is f, the following condition is satisfied: SL/f=1.1433.

When an axial distance between the aperture stop ST and the rear-side surface of the second optical lens element E2 is ER, and the axial distance between the aperture stop ST and the image surface IMG is SL, the following condition is satisfied: ER/SL=0.4167.

When the focal length of the optical system 1 is f, and an image height on the image surface IMG is ImgH, the following condition is satisfied: f/ImgH=1.1049.

When a central thickness of the first optical lens element E1 is CT1, a central thickness of the second optical lens element E2 is CT2, and an axial distance between the rear-side surface of the first optical lens element E1 and the front-side surface of the second optical lens element E2 is T12, the following condition is satisfied: (CT1+CT2)/T12=0.876.

When an axial distance between the front-side surface of the first optical lens element E1 and the rear-side surface of the second optical lens element E2 is TD, and the axial distance between the aperture stop ST and the image surface IMG is SL, the following condition is satisfied: TD/SL=0.4386.

When a size of the aperture stop ST is EPD, and the image height on the image surface IMG is ImgH, the following condition is satisfied: EPD/ImgH=0.4737.

When the axial distance between the rear-side surface of the first optical lens element E1 and the front-side surface of the second optical lens element E2 is T12, and the axial distance between the front-side surface of the first optical lens element E1 and the image surface IMG is BL, the following condition is satisfied: T12/BL=5.7598.

The detailed optical data of the 1st embodiment are shown in Table 1 and the aspheric surface data are shown in Table 2 below.

TABLE 1

1st Embodiment
f = 20.99 mm, Fno = 2.33, HFOV = 46 deg.

| Surface# | | Curvature Radius | | Thickness | Material | Index | Abbe # | Refraction/Reflection |
|---|---|---|---|---|---|---|---|---|
| 0 | | Plano | | −600.000 | | | | Refraction |
| 1 | ST | Plano | | 2.500 | | | | Refraction |
| 2 | | Plano | | 10.000 | | | | Refraction |
| 3 | E2 | −15.8812 | (ASP) | 1.200 | Plastic | 1.544 | 56.0 | Refraction |
| 4 | QWP2 | −26.7137 | (ASP) | 0.293 | Plastic | 1.534 | 55.9 | Refraction |
| 5 | | −27.0067 | (ASP) | 5.317 | | | | Refraction |
| 6 | E1 | −33.7193 | (ASP) | 3.715 | Plastic | 1.544 | 56.0 | Refraction |
| 7 | BS | −27.8867 | (ASP) | −3.715 | Plastic | 1.544 | 56.0 | Reflection |
| 8 | | −33.7193 | (ASP) | −5.317 | | | | Refraction |
| 9 | | −27.0067 | (ASP) | −0.293 | | | | Refraction |
| 10 | E2 | −26.7137 | (ASP) | 0.293 | | | | Reflection |
| 11 | | −27.0067 | (ASP) | 5.317 | | | | Refraction |
| 12 | E1 | −33.7193 | (ASP) | 3.715 | Plastic | 1.544 | 56.0 | Refraction |
| 13 | | −27.8867 | (ASP) | 0.500 | | | | Refraction |
| 14 | | Plano | | 0.207 | | | | Refraction |
| 15 | QWP1 | Plano | | 0.293 | Plastic | 1.534 | 55.9 | Refraction |
| 16 | | Plano | | 0.000 | | | | Refraction |
| 17 | IMG | Plano | | −0.026 | | | | Refraction |

Note:
Reference wavelength is 587.6 nm (d-line).
The reflective polarizer RP is located between the second optical lens element E2 and the second quarter-wave plate QWP2.

TABLE 2

Aspheric Coefficients

| | Surface # | | | |
|---|---|---|---|---|
| | 3 | 4 | 6 | 7 |
| k = | −2.676492787 | −3.454182727 | −3.496109826 | −0.09823858 |
| A4 = | −9.144260917 | −1.514958384 | −2.530955323 | −0.46703396 |
| A6 = | −0.079359645 | — | 0.045764708 | −0.02861758 |
| A8 = | — | — | — | 0.001084547 |
| A10 = | — | — | — | −3.07353E−05 |
| A12 = | — | — | — | −3.77244E−07 |

In Table 1, the curvature radius and the thickness are shown in millimeters (mm). Surface numbers 17-0 represent the surfaces sequentially passed through by light from the image surface IMG to the aperture stop ST. In Table 2, k represents the conic coefficient of the equation of the aspheric surface profiles. A4-A12 represent the aspheric coefficients ranging from the 4th order to the 12th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 2:
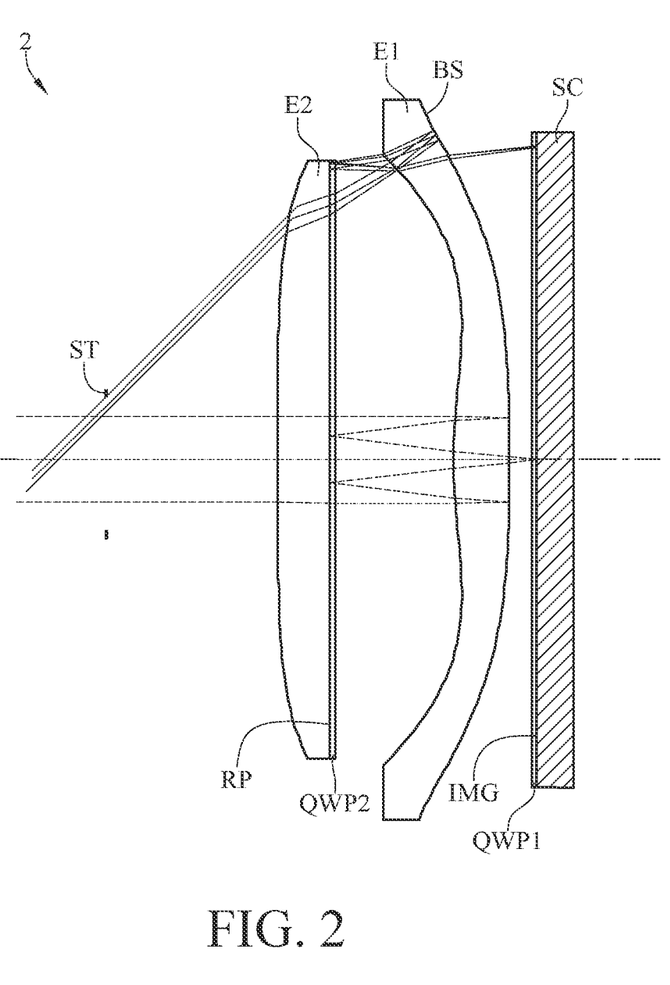
FIG. 2 is a schematic view of an optical system and a display unit according to the 2nd embodiment of the present disclosure.

FIG. 2 is a schematic view of an optical system and a display unit according to the 2nd embodiment of the present disclosure. The optical system 2 includes, in order from a front side to a rear side, an image surface IMG, a first quarter-wave plate QWP1, a partial reflector BS, a first optical lens element E1, a second quarter-wave plate QWP2, a reflective polarizer RP, a second optical lens element E2 and an aperture stop ST. The display unit SC is disposed on the image surface IMG, and the display unit SC includes a polarizer. The optical system 2 includes two optical lens elements (E1 and E2) with no additional optical lens element disposed between the two optical lens elements.

The first optical lens element E1 with positive refractive power has a front-side surface being convex and a rear-side surface being convex. The first optical lens element E1 is made of plastic material and has the front-side surface and the rear-side surface being both aspheric. The rear-side surface of the first optical lens element E1 has at least one inflection point and at least one critical point.

The second optical lens element E2 with negative refractive power has a front-side surface being planar and a rear-side surface being concave. The second optical lens element E2 is made of plastic material and has the rear-side surface being aspheric.

The first quarter-wave plate QWP1 is disposed on the image surface IMG.

The partial reflector BS is attached to the front-side surface of the first optical lens element E1, and the partial reflector BS has an average light reflectivity of 50%.

The reflective polarizer RP is attached to the front-side surface of the second optical lens element E2, and the second quarter-wave plate QWP2 is attached to the reflective polarizer RP.

The detailed optical data of the 2nd embodiment are shown in Table 3 and the aspheric surface data are shown in Table 4 below.

TABLE 3

2nd Embodiment
f = 19 mm, Fno = 2.11, HFOV = 45 deg.

| Surface# | | Curvature Radius | | Thickness | Material | Index | Abbe # | Refraction/Reflection |
|---|---|---|---|---|---|---|---|---|
| 0 | | Plano | | Infinity | | | | Refraction |
| 1 | ST | Plano | | 2.500 | | | | Refraction |
| 2 | | Plano | | 10.000 | | | | Refraction |
| 3 | E2 | −560.1115 | (ASP) | 2.978 | Plastic | 1.544 | 56.0 | Refraction |
| 4 | QWP2 | Plano | | 0.293 | Plastic | 1.534 | 55.9 | Refraction |
| 5 | | Plano | | 6.940 | | | | Refraction |
| 6 | E1 | 30.9573 | (ASP) | 3.245 | Plastic | 1.544 | 56.0 | Refraction |
| 7 | BS | −184.6928 | (ASP) | −3.245 | Plastic | 1.544 | 56.0 | Reflection |
| 8 | | 30.9573 | (ASP) | −6.940 | | | | Refraction |
| 9 | | Plano | | −0.293 | | | | Refraction |
| 10 | E2 | Plano | | 0.293 | | | | Reflection |
| 11 | | Plano | | 6.940 | | | | Refraction |
| 12 | E1 | 30.9573 | (ASP) | 3.245 | Plastic | 1.544 | 56.0 | Refraction |
| 13 | | −184.6928 | (ASP) | 0.500 | | | | Refraction |
| 14 | | Plano | | 0.807 | | | | Refraction |
| 15 | QWP1 | Plano | | 0.293 | Plastic | 1.534 | 55.9 | Refraction |
| 16 | | Plano | | 0.000 | | | | Refraction |
| 17 | IMG | Plano | | −0.056 | | | | Refraction |

Note:
Reference wavelength is 587.6 nm (d-line).
The reflective polarizer RP is located between the second optical lens element E2 and the second quarter-wave plate QWP2.

TABLE 4

Aspheric Coefficients

| | Surface # | | |
|---|---|---|---|
| | 3 | 6 | 7 |
| k = | −99 | −12.86911255 | −37.99565596 |
| A4 = | 1.060650641 | −14.72727613 | −4.265976243 |
| A6 = | −0.00240966 | 2.125115017 | 0.508504036 |
| A8 = | 0.010659941 | — | −0.010723923 |
| A10 = | — | — | 0.007920168 |
| A12 = | — | — | 0.002365434 |
| A14 = | — | — | 0.002716189 |
| A16 = | — | — | −0.001183366 |

In the 2nd embodiment, the equation of the aspheric surface profiles of the aforementioned optical lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 19 | SL/f | 1.3158 |
| HFOV [deg.] | 45 | ER/SL | 0.5263 |
| Fno | 2.11 | f/ImgH | 1 |
| |R3|/|R4| | ∞ (infinity) | (CT1 + CT2)/T12 | 0.86 |
| V1/N1 | 36.27 | TD/SL | 0.5382 |
| V1 + V2 | 112 | EPD/ImgH | 0.4737 |
| N1 + N2 | 3.0881 | T12/BL | 4.6846 |
| f/BL | 12.306 | — | — |

3rd Embodiment

Figure 3:
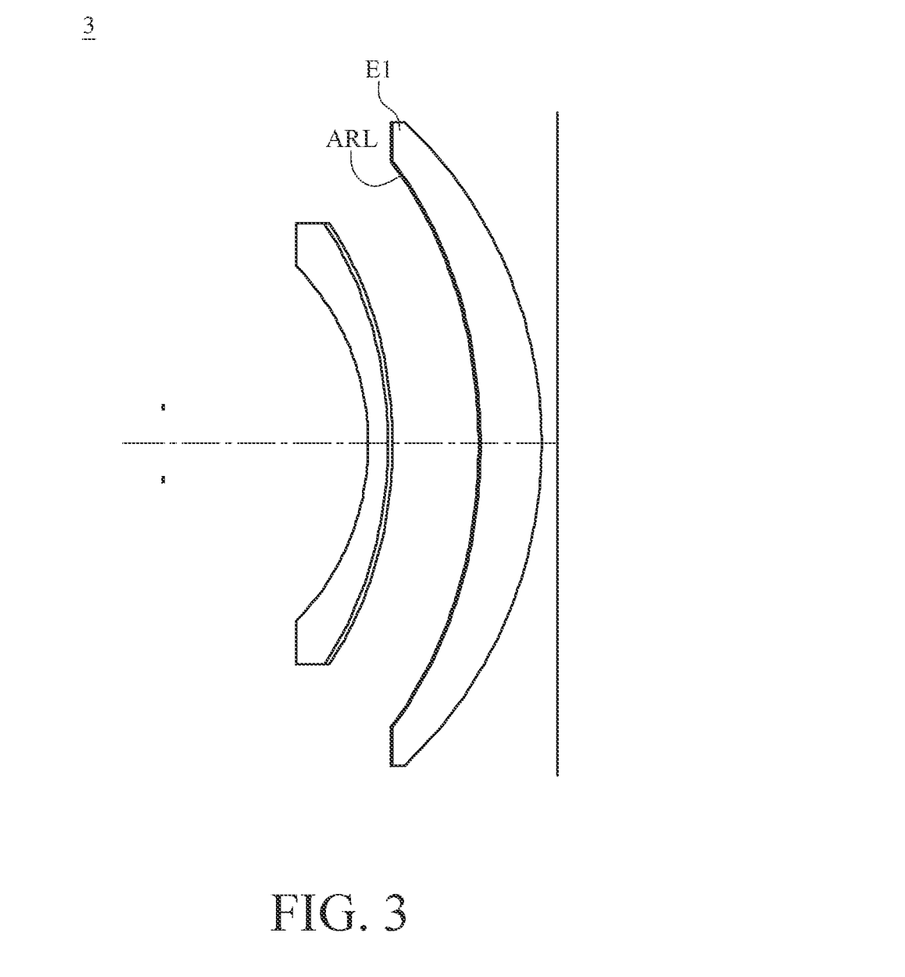
FIG. 3 is a schematic view of an optical system according to the 3rd embodiment of the present disclosure.

FIG. 3 is a schematic view of an optical system according to the 3rd embodiment of the present disclosure. In this embodiment, the optical system 3 has a configuration similar to that of the optical system 1 as disclosed in the 1st embodiment, and they are different from each other in that in this embodiment, the rear-side surface of the first optical lens element E1 has an anti-reflection layer ARL, and the anti-reflection layer ARL is a subwavelength structure. The optical systems of the two embodiments having similar configurations can be interpreted as that elements in one of the two optical systems have the same structural features as respective elements in the other optical system, except for the first optical lens element, and the details in this regard will be omitted hereafter.

In this embodiment, in the optical system 3, the rear-side surface of the first optical lens element E1 is provided with the anti-reflection layer ARL, but the present disclosure is not limited thereto. In other embodiments, any lens surface of the optical lens elements of the optical system may be provided with an anti-reflection layer according actual design requirements.

4th Embodiment

Figure 4:
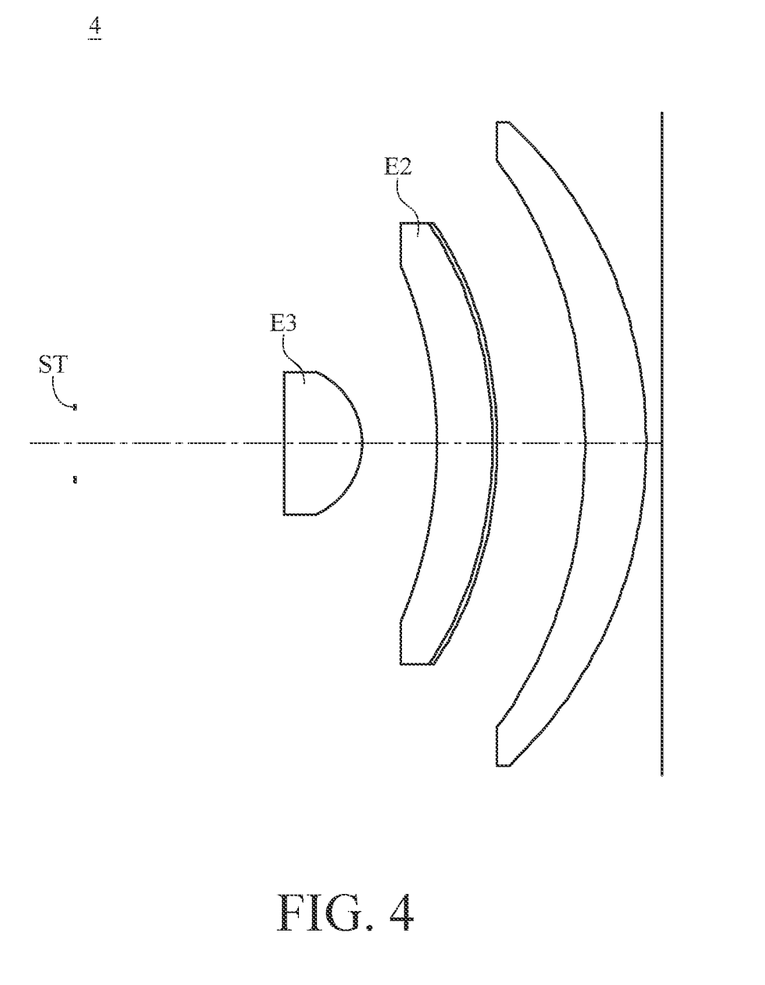
FIG. 4 is a schematic view of an optical system according to the 4th embodiment of the present disclosure.

FIG. 4 is a schematic view of an optical system according to the 4th embodiment of the present disclosure. In this embodiment, the optical system 4 has a configuration similar to that of the optical system 1 as disclosed in the 1st embodiment, and they are different from each other in that in this embodiment, the optical system 4 further includes a third optical lens element E3 located between the aperture stop ST and the second optical lens element E2, and the rear-side surface of the third optical lens element E3 is planar. The optical systems of the two embodiments having similar configurations can be interpreted as that elements in one of the two optical systems have the same structural features as respective elements in the other optical system, except the number of optical lens elements and the lens surface shapes, and the details in this regard will be omitted hereafter.

In this embodiment, the rear-side surface of the third optical lens element E3 is planar, and the front-side surface of the third optical lens element E3 is non-planar, but the present disclosure is not limited thereto. In other embodiments, the front-side surface of the third optical lens element can be planar, and the rear-side surface of the third optical lens element can be non-planar.

5th Embodiment

Figure 5:
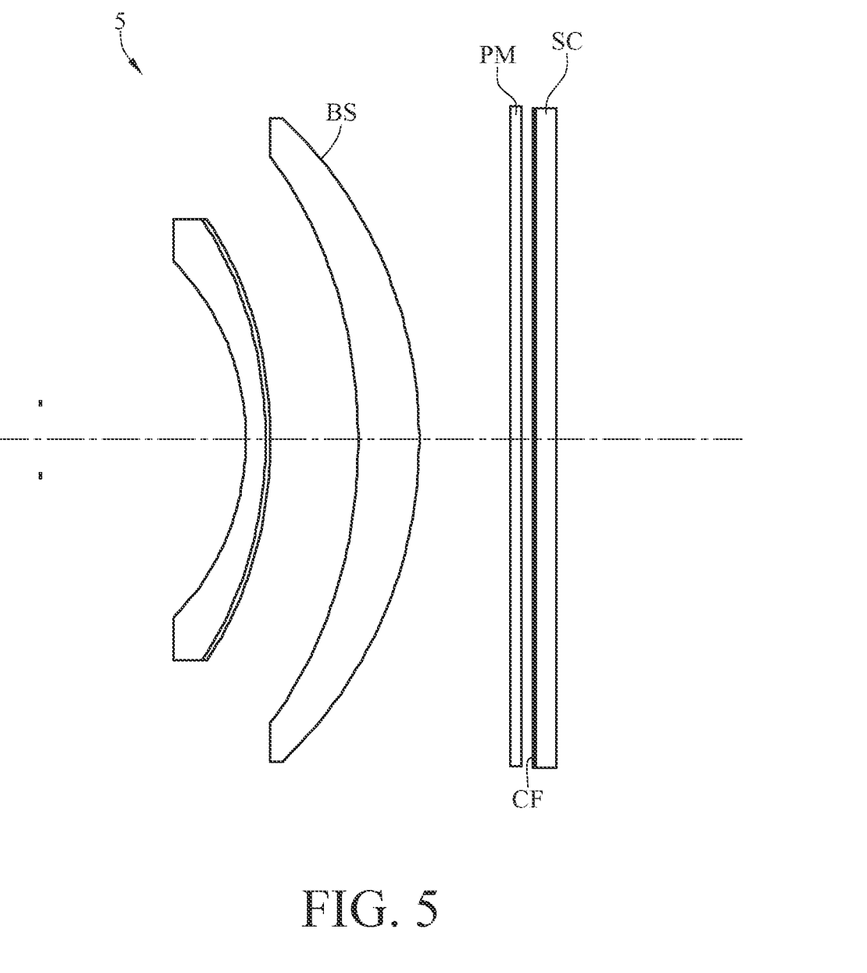
FIG. 5 is a schematic view of an optical system and a display unit according to the 5th embodiment of the present disclosure.

FIG. 5 is a schematic view of an optical system and a display unit according to the 5th embodiment of the present disclosure. In this embodiment, the optical system 5 has a configuration similar to that of the optical system 1 as disclosed in the 1st embodiment, and they are different from each other in that in this embodiment, the optical system 5 further includes a polarizing element PM located between the display unit SC and the partial reflector BS. In addition, in this embodiment, the display unit SC is an organic light emitting diode panel and has a color filter CF. The optical systems of the two embodiments having similar configurations can be interpreted as that elements in one of the two optical systems have the same structural features as respective elements in the other optical system, except for the polarizing element and the display unit, and the details in this regard will be omitted hereafter.

6th Embodiment

Figure 6:
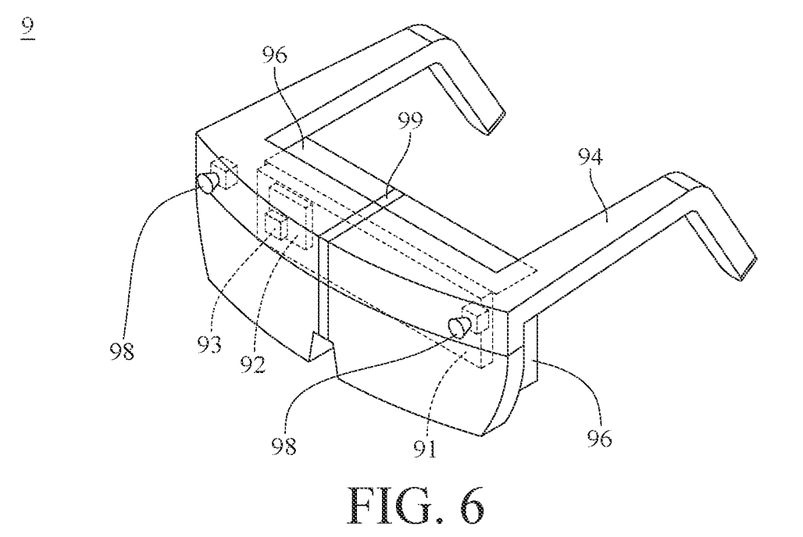
FIG. 6 is a perspective view of a head-mounted device according to the 6th embodiment of the present disclosure.
Figure 7:
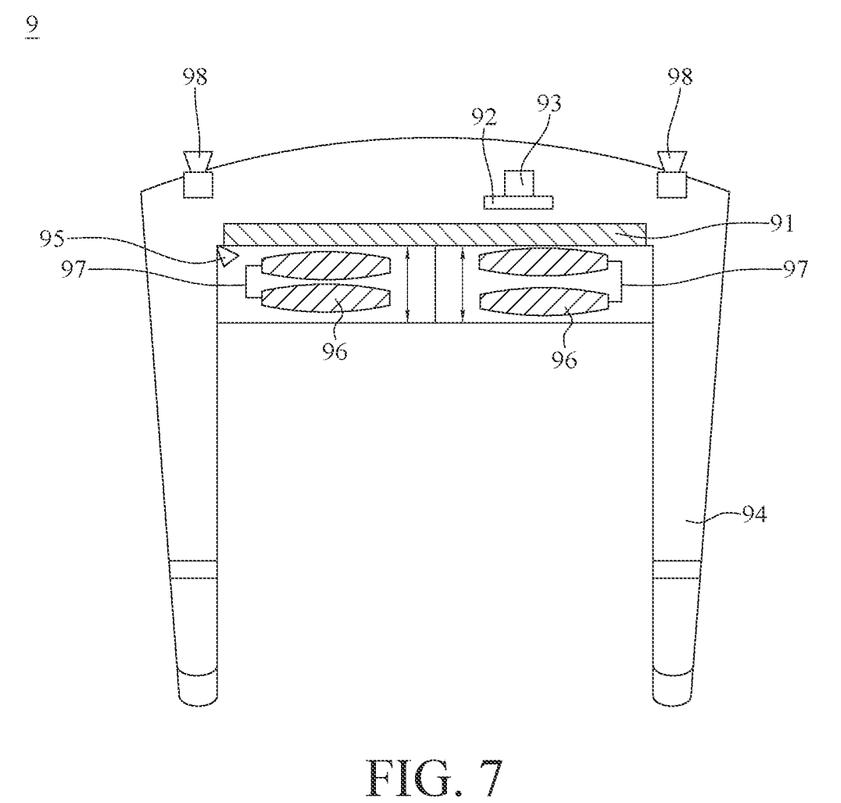
FIG. 7 is a top view of the head-mounted device in FIG. 6.

FIG. 6 is a perspective view of a head-mounted device according to the 6th embodiment of the present disclosure. FIG. 7 is a top view of the head-mounted device in FIG. 6.

In this embodiment, the head-mounted device 9 includes a display unit 91, a digital signal processor 92, an inertial measurement unit 93, a support structure 94, an eye tracking unit 95, two optical systems 96, two auto focus units 97, two cameras 98 and a compacting mechanism 99. Each of the optical systems 96 can be one of the optical systems of the aforementioned embodiments, and the present disclosure is not limited thereto.

The display unit 91 is configured to face the user's eyes to display an image. The inertial measurement unit 93 is configured to measure the angular velocity and acceleration of the head-mounted device 9 in the three-dimensional space so as to obtain the orientation of the head-mounted device 9. The support structure 94 may be at least one band or at least one structure similar to glasses temple for stabilizing the head-mounted device 9 on the user's head. The eye tracking unit 95 is configured to adjust the clarity of each area of an image according to the gaze area of the eyes. The two optical systems 96 respectively correspond to the user's two eyes. The two auto focus units 97 are respectively disposed corresponding to the two optical systems 96, and the auto focus units 97 are configured to move the optical lens elements of the optical systems 96, so that the focal length is adjustable according to the vision of various users so as to provide the optical systems 96 with a focus function. The cameras 98 and the display unit 91 are respectively in signal communication with the digital signal processor 92, and the cameras 98 are configured to capture images of external environment for displaying on the display unit 91 via the digital signal processor 92. The images of external environment captured by the cameras 98 can be instantly displayed on the display unit 91, so that the user wearing the head-mounted device 9 is able to recognize the environment. Therefore, with the arrangement of the cameras, the captured images of external environment can be instantly displayed on the display unit, and thus, the head-mounted device can be provided with an augmented reality feature. Furthermore, with the arrangement of at least two cameras, the head-mounted device 9 can have various magnification ratios so as to meet the requirement of optical zoom functionality, or the head-mounted device 9 can have a recognition function by using a computer vision method. In addition, the multiple-camera configuration may include a LIDAR module, such as a structured light module or a time-of-flight module, for providing various functionalities. The compacting mechanism 99 is configured such that the dimensions of the head-mounted device 9 can be reduced (e.g., folding the head-mounted device 9) when the head-mounted device 9 is not in use.

In some configurations, the head-mounted device may be provided with Bluetooth or wireless network functions so as to be in signal communication with at least one external device.

In some configurations, the head-mounted device may include at least one speaker, at least one earphone, or at least one noise-cancelling earphone so as to provide the user with sound. Moreover, in some configurations, the head-mounted device may include at least one microphone so as to receive the user's voice.

In some configurations, the head-mounted device may be paired with at least one controller, such as a game joystick, a game pad or a gaming handheld unit, so that the user is able to interact with the augmented reality head-mounted device.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical system, comprising:
an image surface, located at a front side of the optical system;
an aperture stop, located at a rear side of the optical system;
a first quarter-wave plate, located between the image surface and the aperture stop;
a partial reflector, having an average light reflectivity of at least 35%, wherein the partial reflector is located between the first quarter-wave plate and the aperture stop;
a second quarter-wave plate, located between the partial reflector and the aperture stop;
a reflective polarizer, located between the second quarter-wave plate and the aperture stop;
a first optical lens element, located between the image surface and the aperture stop, wherein the first optical lens element has a front-side surface being convex; and
a second optical lens element, located between the first optical lens element and the aperture stop, wherein the second optical lens element has a rear-side surface being concave;
wherein a curvature radius of a front-side surface of the second optical lens element is R3, a curvature radius of the rear-side surface of the second optical lens element is R4, a central thickness of the first optical lens element is CT1, a central thickness of the second optical lens element is CT2, an axial distance between a rear-side surface of the first optical lens element and the front-side surface of the second optical lens element is T12, and the following conditions are satisfied:

$|R3|/|R4|>1.2$; and $0.5<(CT1+CT2)/T12<1.5$.

2. The optical system of claim 1, wherein the rear-side surface of the first optical lens element has at least one inflection point.

3. The optical system of claim 1, wherein the rear-side surface of the first optical lens element has at least one critical point.

4. The optical system of claim 1, wherein the first optical lens element has positive refractive power.

5. The optical system of claim 1, wherein the second optical lens element has negative refractive power.

6. The optical system of claim 1, wherein the curvature radius of the front-side surface of the second optical lens element is R3, the curvature radius of the rear-side surface of the second optical lens element is R4, and the following condition is satisfied:

$|R3|/|R4|>1.5$.

7. The optical system of claim 1, wherein at least one lens surface of at least one of the first optical lens element and the second optical lens element is aspheric.

8. The optical system of claim 1, wherein an Abbe number of the first optical lens element is V1, a refractive index of the first optical lens element is N1, and the following condition is satisfied:

$33<V1/N1<38$.

9. The optical system of claim 1, wherein an Abbe number of the first optical lens element is V1, an Abbe number of the second optical lens element is V2, and the following condition is satisfied:

$110<V1+V2<115$.

10. The optical system of claim 1, wherein a refractive index of the first optical lens element is N1, a refractive index of the second optical lens element is N2, and the following condition is satisfied:

$2.8<N1+N2<3.2$.

11. The optical system of claim 1, wherein a focal length of the optical system is f, an axial distance between the front-side surface of the first optical lens element and the image surface is BL, and the following condition is satisfied:

$11<f/BL<22$.

12. The optical system of claim 1, wherein an axial distance between the aperture stop and the image surface is SL, a focal length of the optical system is f, and the following condition is satisfied:

$0<SL/f<2$.

13. The optical system of claim 1, wherein an axial distance between the aperture stop and the rear-side surface of the second optical lens element is ER, an axial distance between the aperture stop and the image surface is SL, and the following condition is satisfied:

$0<ER/SL<0.5$.

14. The optical system of claim 1, wherein a focal length of the optical system is f, an image height on the image surface is ImgH, and the following condition is satisfied:

$0.8 < f/\text{ImgH} < 1.2$.

15. The optical system of claim 1, wherein the central thickness of the first optical lens element is CT1, the central thickness of the second optical lens element is CT2, the axial distance between the rear-side surface of the first optical lens element and the front-side surface of the second optical lens element is T12, and the following condition is satisfied:

$0.86 \leq (CT1+CT2)/T12 < 1.5$.

16. The optical system of claim 1, wherein an axial distance between the front-side surface of the first optical lens element and the rear-side surface of the second optical lens element is TD, an axial distance between the aperture stop and the image surface is SL, and the following condition is satisfied:

$0.2 < TD/SL < 0.8$.

17. The optical system of claim 1, wherein a size of the aperture stop is EPD, an image height on the image surface is ImgH, and the following condition is satisfied:

$0.45 < EPD/\text{ImgH} < 0.65$.

18. The optical system of claim 1, wherein the axial distance between the rear-side surface of the first optical lens element and the front-side surface of the second optical lens element is T12, an axial distance between the front-side surface of the first optical lens element and the image surface is BL, and the following condition is satisfied:

$4 < T12/BL < 6$.

19. The optical system of claim 1, wherein at least one lens surface of at least one of the first optical lens element and the second optical lens element has an anti-reflection layer, and the anti-reflection layer is a subwavelength structure.

20. The optical system of claim 1, further comprising a third optical lens element, wherein the third optical lens element is located between the aperture stop and the image surface, and at least one lens surface of the third optical lens element is planar.

21. A head-mounted device, comprising:
a display unit, configured to face a user's eyes to display an image;
a digital signal processor, in signal communication with the display unit;
an inertial measurement unit, in signal communication with the digital signal processor;
a support structure, configured to be worn on the user's head; and
two optical systems, located on one side of the display unit, and each of the optical systems comprising:
an image surface, located at a front side of the optical system, wherein the image surface is located on the display unit;
an aperture stop, located at a rear side of the optical system;
a first quarter-wave plate, located between the image surface and the aperture stop;
a partial reflector, having an average light reflectivity of at least 35%, wherein the partial reflector is located between the first quarter-wave plate and the aperture stop;
a second quarter-wave plate, located between the partial reflector and the aperture stop;
a reflective polarizer, located between the second quarter-wave plate and the aperture stop;
a first optical lens element, located between the image surface and the aperture stop, wherein the first optical lens element has a front-side surface being convex; and
a second optical lens element, located between the first optical lens element and the aperture stop, wherein the second optical lens element has a rear-side surface being concave;
wherein a curvature radius of a front-side surface of the second optical lens element is R3, a curvature radius of the rear-side surface of the second optical lens element is R4, a central thickness of the first optical lens element is CT1, a central thickness of the second optical lens element is CT2, an axial distance between a rear-side surface of the first optical lens element and the front-side surface of the second optical lens element is T12, and the following conditions are satisfied:

$|R3|/|R4| > 1.2$; and $0.5 < (CT1+CT2)/T12 < 1.5$.

22. The head-mounted device of claim 21, further comprising at least one camera, wherein the at least one camera is in signal communication with the digital signal processor, and the at least one camera is configured to capture an image of external environment for displaying on the display unit.

23. The head-mounted device of claim 21, wherein each of the optical systems further comprises a polarizing element located between the display unit and the partial reflector, and the display unit is an organic light emitting diode panel and has a color filter.

24. The head-mounted device of claim 21, further comprising at least one compacting mechanism, wherein the at least one compacting mechanism is configured for reducing dimensions of the head-mounted device.

* * * * *